United States Patent
Cernusco

[19]
[11] Patent Number: 5,878,562
[45] Date of Patent: Mar. 9, 1999

[54] APPARATUS FOR USE IN PICKING FRUIT

[76] Inventor: Lawrence Ronald Cernusco, Roma Peak Road, Via Bowen, Queensland 4805, Australia

[21] Appl. No.: 849,814

[22] PCT Filed: Dec. 14, 1995

[86] PCT No.: PCT/AU95/00850

§ 371 Date: Jun. 16, 1997

§ 102(e) Date: Jun. 16, 1997

[87] PCT Pub. No.: WO96/18288

PCT Pub. Date: Jun. 20, 1996

[30] Foreign Application Priority Data

Dec. 16, 1994 [AU] Australia ................... PN 0069

[51] Int. Cl.⁶ .................................................. A01D 46/24
[52] U.S. Cl. ............................................ 56/328.1; 56/327.1
[58] Field of Search ..................... 56/328.1, 340.1, 56/329, 327.1, 330

[56] References Cited

U.S. PATENT DOCUMENTS

| | | | |
|---|---|---|---|
| 1,501,007 | 7/1924 | Leonard . | |
| 2,450,152 | 9/1948 | Miller | 214/83.1 |
| 2,752,926 | 7/1956 | James | 134/133 |
| 2,821,312 | 1/1958 | Wiegel | 214/83.1 |
| 2,973,112 | 2/1961 | Young | 214/83.1 |
| 3,182,827 | 5/1965 | Frost | 214/83.1 |
| 3,329,290 | 7/1967 | Lowery | 214/83.1 |
| 3,356,196 | 12/1967 | Sims | 193/7 |
| 3,389,542 | 6/1968 | Rasmussen | 56/331 |
| 3,396,816 | 8/1968 | Kennedy | 182/49 |
| 3,464,529 | 9/1969 | Horsky | 193/7 |
| 3,493,132 | 2/1970 | Merrill | 214/83.1 |
| 3,854,273 | 12/1974 | Rosenberg | 56/336 |
| 4,064,683 | 12/1977 | Tennes et al. | 56/328 |
| 4,320,995 | 3/1982 | Tennes et al. | 56/328.1 X |
| 4,476,670 | 10/1984 | Ukai et al. | 56/329 |
| 4,558,561 | 12/1985 | Mendenhall | 56/327 |

*Primary Examiner*—Terry Lee Melius
*Attorney, Agent, or Firm*—Fish & Richardson P.C.

[57] ABSTRACT

An apparatus for use in fruit picking comprising a mobile support structure (11), a conduit (19) supported by the mobile support and having an inlet section for entry of fruit, an outlet section for discharge of fruit and a fluid inlet for entry of fluid, a fluid supply means (17, 37, 38, 22) for directing fluid through the fluid inlet down an inner surface of the conduit along which fruit moves, a recovering area (17) for receipt of fruit discharged through the outlet section and a retarding means in the conduit to retard motion of fruit travelling through the conduit under the action of gravity.

29 Claims, 4 Drawing Sheets

APPARATUS FOR USE IN PICKING FRUIT

FIELD OF THE INVENTION

The present invention is concerned with apparatus for picking fruit. For convenience, the invention will be described primarily with reference to an apparatus for picking mangoes but it will be understood that the apparatus can be equally used to pick other fruits and indeed can be used to retrieve other items from an elevated position.

BACKGROUND OF THE INVENTION

In mango plantations, mangoes are conventionally picked by a person armed with a long stick with a knife on its end who reaches up and cuts each mango from the tree. To alleviate the need for another person to catch the mango, the picker works from a trampoline on which the mango lands. The mango bounces from the trampoline into a water tank. In the water tank any sap on the mango is washed off before it can mark the skin of the mango.

While a mango which lands squarely on the trampoline will clearly suffer less bruising than a mango dropped onto the ground there is still some degree of bruising of the fruit. Furthermore, it is not always easy to direct where the mango falls with enough precision to ensure it lands on the trampoline and some mangoes may fall a long distance into the quite shallow water tank and land heavily on its bottom or even land on the ground adjacent the trampoline. It is also likely that not all of the mangoes which land on the trampoline will bounce directly into the water tank; some may bounce onto the ground and others may come to rest on the trampoline. In the former case substantial bruising will occur and in the latter case (unless the picker stops picking and bends over to pick up the mango and throw it into the water tank) the mango will suffer sap burns which reduce its value. The present invention provides a technique of picking fruit such as mangoes which minimises damage to the fruit.

SUMMARY OF THE INVENTION

According to one aspect of the present invention there is provided an apparatus for use in fruit picking comprising a mobile support structure, a conduit supported by the mobile support structure and having an inlet section for entry of fruit, an outlet section for discharge of fruit and a fluid inlet for entry of fluid, a fluid supply means for directing fluid through the fluid inlet down an inner surface of the conduit along which fruit moves, a recovering area for receipt of fruit discharged through the outlet section and a retarding means in the conduit to retard motion of fruit travelling through the conduit under the action of gravity.

According to another aspect of the present invention there is provided a method of picking fruit including the steps of picking the fruit, placing the fruit in a conduit means which has a liquid running from its inlet to its outlet end, allowing the fruit to move under the action of gravity along the conduit means to its outlet end with liquid beneath the fruit and collecting fruit, the method also including using a retarding means to retard the movement of fruit along the conduit.

Preferably, the outlet from said conduit means is to a tank containing the liquid.

The fruit generally drops a small distance into the tank which is deep enough that the fruit will not hit the bottom. Alternatively, the outlet from said conduit means may be at the surface of the liquid in the tank or may be submerged in which case the liquid may back up into said conduit means.

The liquid is preferably water or an aqueous solution such as a detergent solution Reference made hereinafter to water will be understood to include aqueous solutions Advantageously, the water is recycled through the apparatus.

In a preferred embodiment of the invention, water is supplied to the tank from a water reservoir and is drawn from the tank into a pipe which joins said conduit means adjacent the inlet for the fruit to supply water thereto. The water supplied to said conduit means thereafter runs along said conduit means and is returned to the tank.

Advantageously, the pipe runs from the tank at one end of the tank and the solution reservoir is at the other end, Water from said conduit means also re-enters the tank at a point spaced apart from the point where the pipe runs from the tank so a cross-flow of water from its two entry points to its exit point is created. This cross-flow carries fruit which lands in the tank towards one side and, conveniently, a conveyor is positioned between the point where the mangoes enter the tank and this side to pick up the mangoes as they float with the current.

The conveyor generally runs at an angle from the base of the tank to storage means.

Conveniently, said storage means is a fruit basket into which think fruit is packed and transported to a packing shed but may be a carton, a cold store or the Typically, the apparatus is mobile and can move along a row of fruit trees.

Advantageously, the apparatus includes two upwardly-extending booms, one extending to either side of the apparatus which can be positioned close to the fruit in trees on either side of the apparatus. Each is preferably telescopic.

Preferably, the booms are mounted on turntables.

Each boom includes conduit means each of which is preferably a water trough mounted on the upper surface of the boom. The water trough may be open but a partially or fully closed pipe can also be used.

It is preferred that each water trough include means for retarding the rate of movement of the fruit as it rolls down the fruit trough.

Preferably, the retarding means comprises a net strung across the trough at an appropriate height to drag gently on fruit rolling down the trough.

Preferably the troughs are lined with a shock absorbent material. Advantageously, this material is carpet, which also serves to retard the rate of movement of the fruit down the trough.

The opening to the trough at the top can be enlarged to enable fruit to be dropped more readily into the trough.

Advantageously, a flexible tube which tapers to a large opening is placed over the top end of the trough. A similar tube can be placed over the bottom end but it need not taper.

Each boom can include a platform for supporting a picker at the level of the fruit in the tree. Thus, the fruit can be handpicked and dropped into the trough.

Alternatively, the trough can have an enlarged but rigid end which can be positioned beneath a particular fruit which can then be cut off from the ground. The fruit will fall into the trough and be carried gently to the ground.

Preferably, the booms are orientated at between 30° to 60° from the horizontal but picking can be carried out with the booms at anywhere from near vertical to near horizontal.

Typically, the fruit picked is mangoes.

BRIEF DESCRIPTION OF THE DRAWINGS

Preferred embodiments of the invention will now be described by way of example only with reference to the accompanying drawings in which.

DESCRIPTION OF THE PREFERRED EMBODIMENTS

Figure 1:
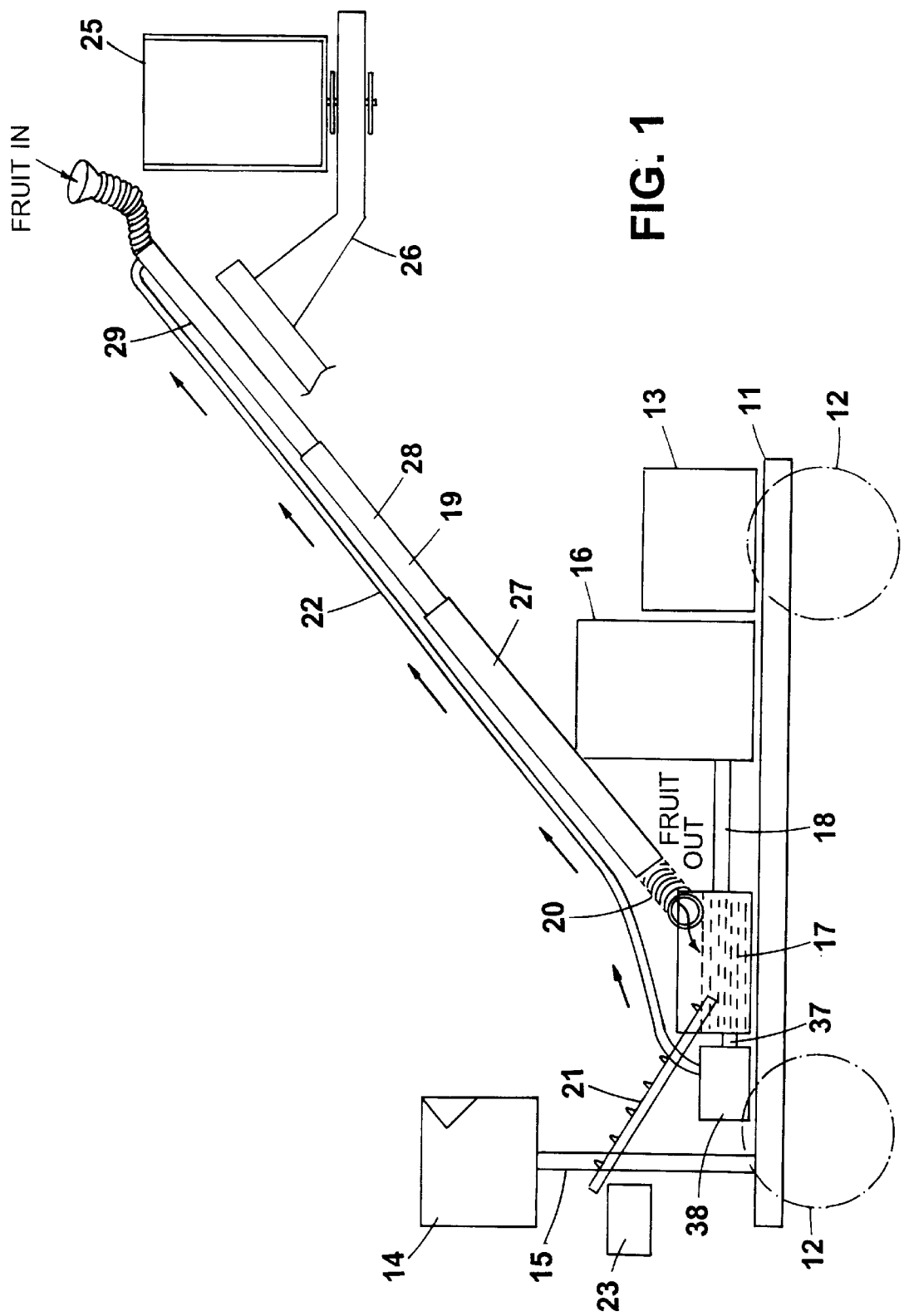
FIG. 1 is a schematic illustration of an apparatus in accordance with the present invention.

The apparatus shown is adapted for mango picking but in order to simplify the representations only one boom is shown and detail of the vehicle other than the boom arrangement has been omitted or shown in entirely schematic fashion. In practice a tractor or similar wheeled vehicle can be converted into a suitable apparatus in accordance with the present invention and so the detailed workings of the apparatus need not be described in detail with the exception of the boom arrangement.

The apparatus 10 has a platform 11 which is mounted on wheels 12 driven by motor unit 13 located on the front of the platform 11 in the conventional manner for tractors and the like. The motor unit 13 also drives the hydraulics associated with the booms. A unit operator platform 14 is located towards the rear of the vehicle and supported in an elevated position by a suitable scaffolding indicated schematically at 15.

A reservoir 16 for storing water is located towards the front of the vehicle, just to the rear of the motor unit. Just to the rear of the reservoir 16 is a water tank 17 which holds 1000 litres of water. The reservoir 16 is connected by pipe 18 to water tank 17 to top up the water level as required. The booms (not shown) are mounted one to each side of the water tank 17. A water trough 19 is mounted on top of each of the booms and a piece of flexible tubing 20 extends from the base of trough 19 to a position just above the surface of the water in tank 17. This tubing 20 constitutes the outlet for the fruit. Additional padded shutes (not shown) can be provided to allow ground pickers to direct the fruit they pick into the trough without endangering themselves by going too Close to the moving vehicles.

Figure 3:
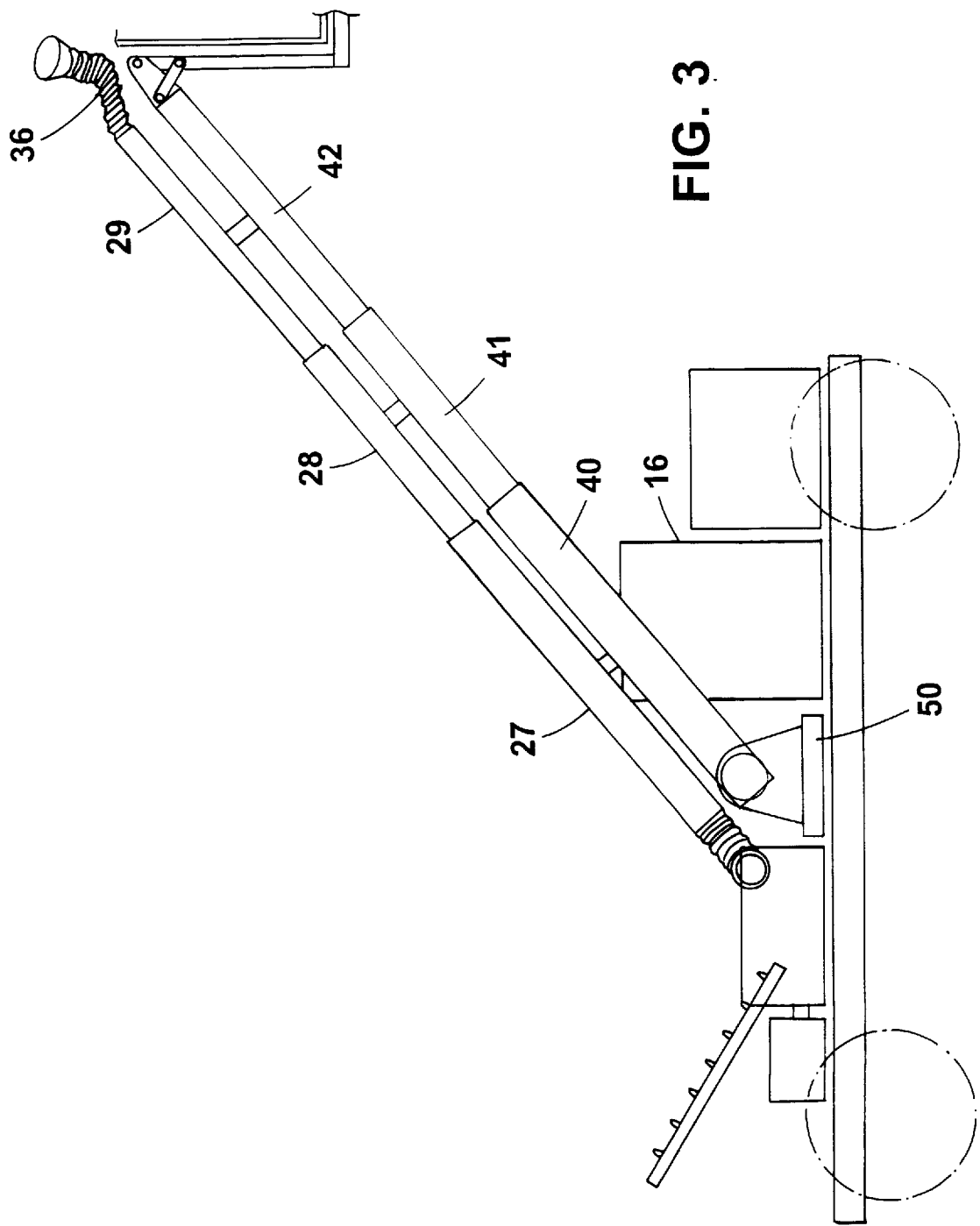
FIG. 3 shows a schematic illustration of the supporting booms incorporated in the apparatus shown in FIG. 1.
Figure 4:
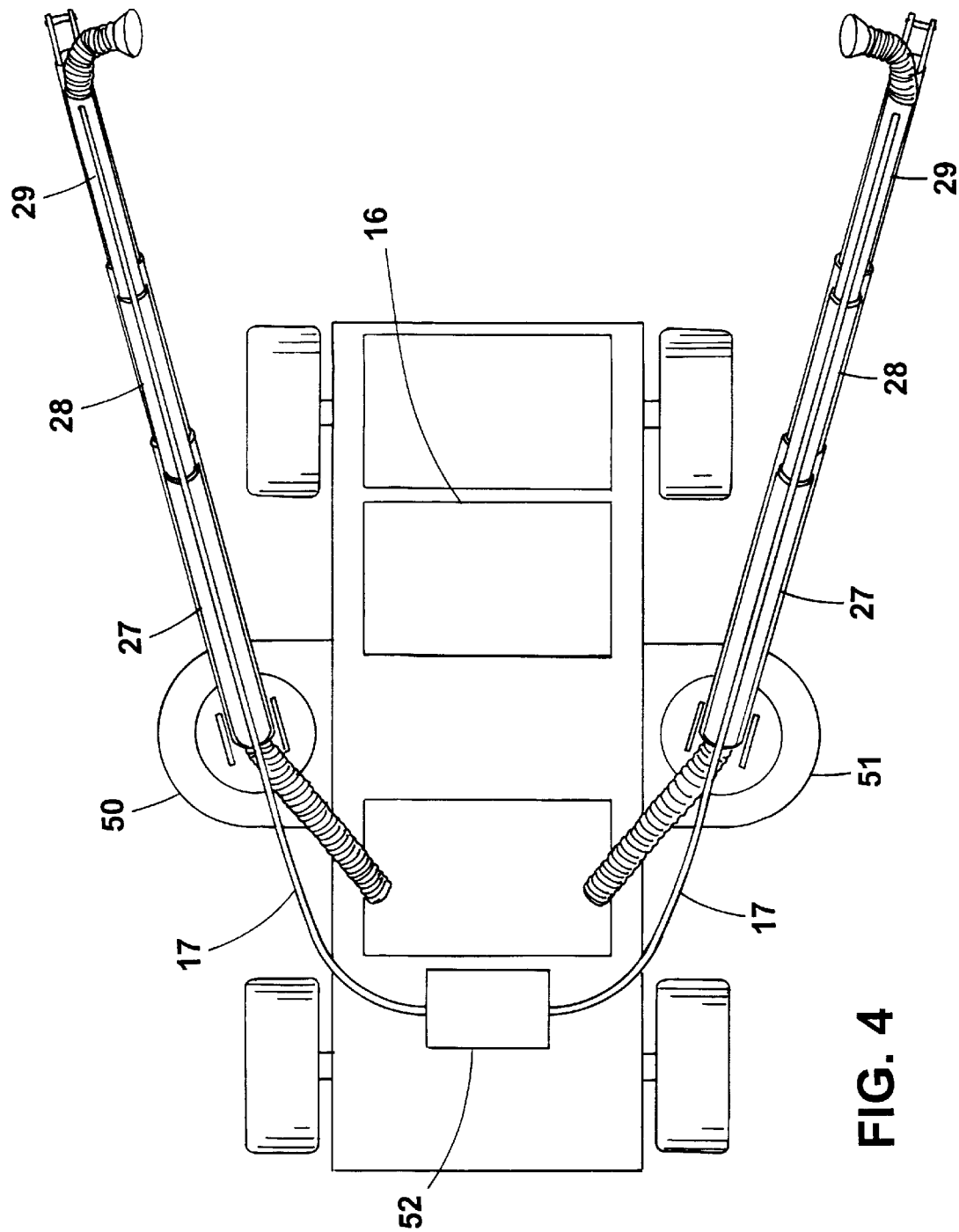
FIG. 4 shows a top view of the apparatus shown in FIG. 1.

As shown in FIGS. 3 and 4 the booms 40, 41 and 42 are mounted on turntables 50, 51 which are hydraulically controlled by the unit driver (not shown) from the unit operator platform 14. The degree of extension of the telescopic booms and the angle at which they are orientated is also controlled by the driver from this position. The water trough 19 telescopes passively under the urging of the hydraulic boom and comprises a plurality of segments 27, 28, 29 which are slidable in the conventional manner. At the end of the boom a picking compartment 25 is mounted on arm 26 which in turn is secured to the boom (not shown). A picker standing in the picking compartment 25 is adjacent the inlet 24 to the trough and simply picks fruit and drops it into the inlet 24

Figure 2:
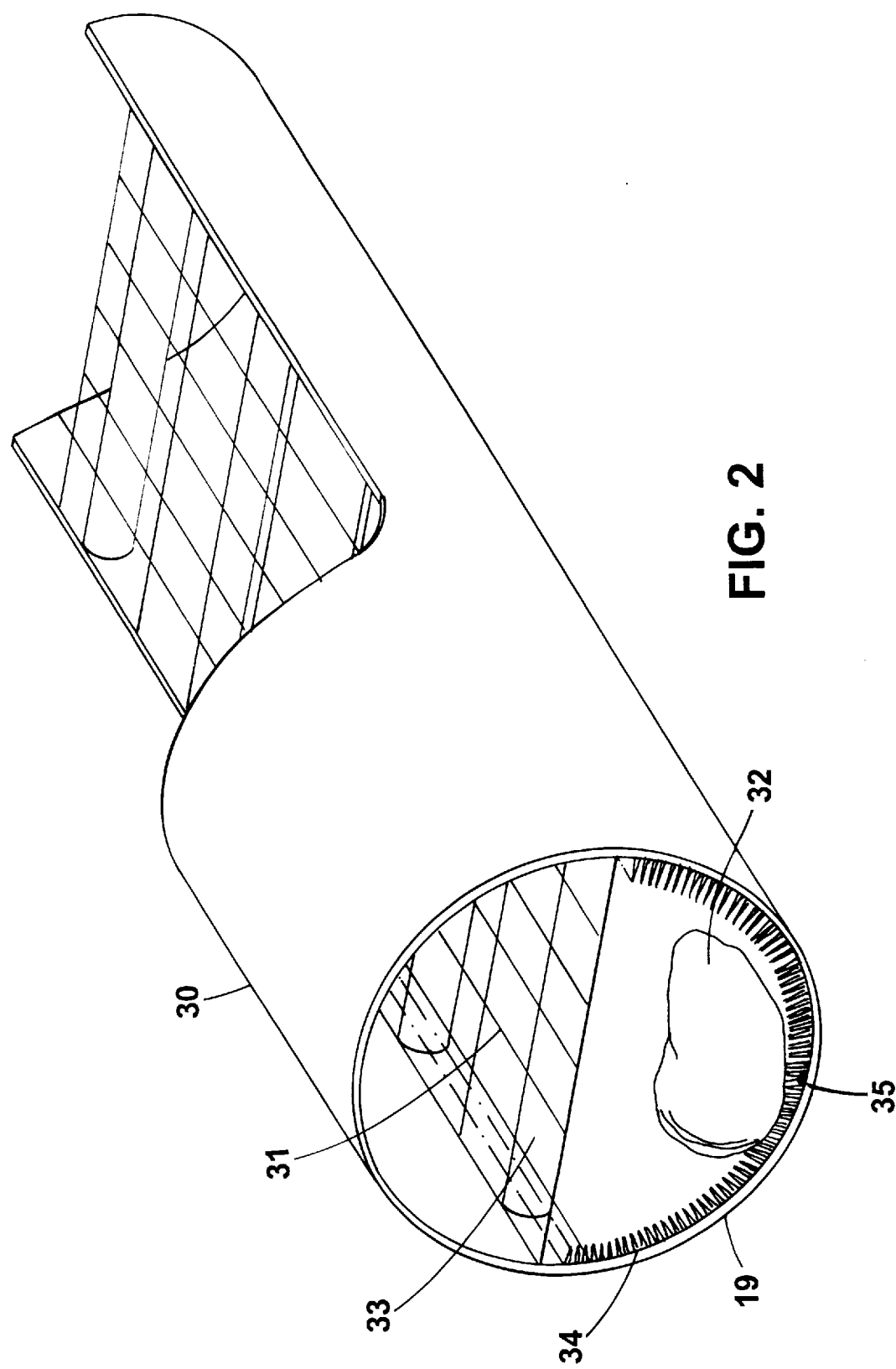
FIG. 2 is an isometric view of the water trough which has been sectioned along line 2—2.

Referring to FIG. 2, it can be seen that the trough 19 has a closed portion 30 towards either end but is otherwise open. A plurality of pegs 33 at intervals along the length of the trough support a net 31 about half way up to the trough. A lining of carpet 34 covers the bottom half of the trough 19 and a piece of fruit 32 is shown rolling down the trough. A thin film of water 35 forms beneath the fruit and ensures that the fruit has a smooth ride down the trough and is not damaged in transit. The water also has some effect in washing the sap from the fruit.

The water in the trough 19 is introduced thereto through a pipe 22 which joins upper segment 29 at a point 36. The pipe receives water from the water tank 17 through pipe 37 and the water is driven up through pipe 22 by pump 38. The fruit placed in the trough 19 emerges through outlet 20 and drops into the water tank 17 where washing of the fruit is completed. The landing the fruit has is soft as it travels down the trough sufficiently slowly that it will not hit the bottom of the tank when it lands.

The fruit is carried by the current in the tank, said current being generated by the flow of water from where it lands from the outlet 20 and from the reservoir 16 towards the outlet to pipe 37, towards the conveyor 21. The fruit rolls onto the conveyor 21 where it is picked up and carried out of the water tank 17 to a fruit basket 23 which is hand filled by a person receiving fruit from the conveyor 21. The fruit baskets are stacked on the rear of the vehicle.

In operation, the apparatus 10 is driven between two rows of mango trees and a picker in each of the picker's compartment 25 on either side of the vehicle picks fruit which is within his reach. The picker directs the operator to manoeuvre the picker's compartments 25 independently so that each picker can pick all fruit on their respective trees as the vehicle moves past it. Hand pickers reach the low lying fruit.

The picker in the picker's compartment 25 removes the fruit from the tree and drops it into inlet 24, whereupon it rolls into the uppermost segment 29 of the water trough 19 Water is introduced to the water trough through pipe 22 at about the point where the fruit enters the trough. A film of water forms beneath the fruit as it slowly rolls down the carpet-lined trough. The top of the fruit will generally be in contact with the net 31 above the fruit and this serves to slow the rolling of the fruit down the trough. The carpet lining of the trough also contributes to slowing the movement of the fruit and reduces damage to the fruit, as does the formation of a film of water between the carpet lining and the fruit. The fruit emerges eventually from outlet 20 and drops a short distance into the water tank 17 and sinks only part of the way into the water in that trough. The current in the trough carries the fruit onto the conveyor 21 whereupon it is conveyed to fruit basket 23. Thus fruit is picked in an efficient manner without damage to the fruit through bruising or through sap burning.

According to another embodiment of the present invention water is sprayed up through the conduit from the outlet end. The sprayed water is directed to slow down fruit rolling through the conduit in the form of water trough 19.

It is preferred that the water pipe 22 is made of a flexible material which allows the pipe to flex as the boom extends and retracts.

As shown in FIG. 4 when two booms and associated conduits are utilised the piping 22 is connected to outlets of a Pump 52.

I claim:

1. An apparatus for use in fruit picking comprising a mobile support structure, a conduit supported by the mobile support structure and having an inlet section for entry of fruit, an outlet section for discharge of fruit and a fluid inlet for entry of liquid, a fluid supply means for directing liquid through the fluid inlet down along an inner base surface of the conduit along which fruit moves to the outlet section, a recovering area for receipt of fruit discharged through the outlet section and a retarding means in the conduit to retard motion of fruit travelling through the conduit under the action of gravity, the conduit in operation being inclined with its inlet section at a top end thereof to allow fruit to be placed into the inlet section to travel through the conduit to the outlet section under the action of gravity along the inner base surface with liquid from the fluid supply means forming a film of water beneath the fruit.

2. An apparatus as claimed in claim 1 wherein the fluid inlet is located at the inlet section.

3. An apparatus as claimed in claim 1 wherein the fluid supply means directs fluid through a plurality of fluid inlets located along the conduit.

4. An apparatus as claimed in claim 2 wherein the fluid supply means directs fluid through a plurality of fluid inlets located along the conduit.

5. An apparatus as claimed in claim 1 comprising a support arm for supporting the conduit.

6. An apparatus as claimed in claim 5 wherein the support arm is telescopic.

7. An apparatus as claimed in claim 6 wherein the conduit is retractable and extendable.

8. An apparatus as claimed in claim 1 wherein the fluid supply means directs liquid up through the conduit to slow down fruit rolling through the conduit.

9. An apparatus as claimed in claim 8 further comprising a picking compartment located adjacent the inlet section.

10. An apparatus as claimed in claim 9 wherein the retarding means comprises a surface extending inside the conduit, which surface is arranged to contact a fruit through the conduit.

11. An apparatus as claimed in claim 10 wherein the retarding means comprises a flexible material forming an upper surface inside the conduit and the upper surface acts as a ceiling which cushions movement of fruit passing through the conduit.

12. An apparatus as claimed in claim 11 wherein the retarding means comprises a gauze material located across the inner side walls of the conduit.

13. An apparatus as claimed in claim 12 wherein the retarding means comprises a fabric loosely hanging down from an upper surface of the conduit.

14. An apparatus as claimed in claim 1 wherein the inner base surface along which fruit is arranged to move towards the outlet comprises a support layer for cushioning fruit moving therealong.

15. An apparatus as claimed in claim 14 wherein the base surface comprises a flexible material.

16. An apparatus as claimed in claim 9 wherein the retarding means comprises side wall elements which are arranged to cushion fruit passing through the conduit.

17. An apparatus as claimed in claim 14 wherein the liquid is arranged to form a film on the support layer.

18. An apparatus as claimed in claim 9 wherein the retarding means comprises inner peripheral elements located on the inner wall of the conduit.

19. An apparatus as claimed in claim 18 wherein the retarding means comprises annular resilient members located on the inner wall of the conduit and through which fruit is arranged to pass.

20. An apparatus as claimed in claim 1 wherein the conduit increases in width from the inlet section to the outlet section.

21. An apparatus as claimed in claim 1 further comprising a reservoir below the outlet section, the reservoir being arranged to be filled with water and receive fruit form the outlet section.

22. An apparatus as claimed in claim 1 comprising a mobility means to allow the apparatus to be moved from one location to another.

23. An apparatus as claimed in claim 1 wherein the fluid supply means comprises a pump for pumping liquid from a container.

24. An apparatus as claimed in claim 22 wherein the mobility means comprises wheels.

25. An apparatus as claimed in claim 1 further comprising driving means to permit the conduit to be raised or lowered to a predetermined height.

26. An apparatus as claimed in claim 1 comprising a plurality of conduits.

27. An apparatus as claimed in claim 1 wherein the liquid supply comprises liquid jets for directing liquid through the fluid inlet.

28. An apparatus as claimed in claim 27 wherein one fluid inlet is located at each junction between sections of the conduit.

29. An apparatus as claimed in claim 1 wherein the fluid supply means comprises a pump for pumping liquid from a container.

* * * * *